3,481,935
1-SUBSTITUTED-AMINOLOWERALKYL-4-SUBSTITUTED-PHENYL-PIPERIDINES

Andrew S. Tomcufcik, Old Tappan, N.J., Paul F. Fabio, Pearl River, N.Y., and Arlene M. Hoffman, Park Ridge, N.J., assignors to American Cyanamid Company, Stamford, Conn., a corporation of Maine
No Drawing. Filed Feb. 7, 1966, Ser. No. 525,366
Claims priority, application Great Britain, Mar. 19, 1965, 11,813/65
Int. Cl. C07d 29/34, 29/32, 29/28
U.S. Cl. 260—293                        8 Claims

ABSTRACT OF THE DISCLOSURE

The invention describes mono and di 4-substituted piperidines and tetrahydropyridines which have in the 1-position a substituted aminopropylene or substituted aminobutylene group. The compounds of the invention are useful for their activity in inhibiting the growth of protozoa.

---

This invention relates to new organic compounds. More particularly, it relates to substituted alkylpiperidines and methods of preparation thereof.

The novel compounds of this invention may be illustrated by the following formula:

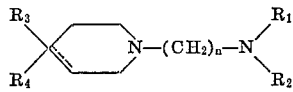

wherein $R_1$ is lower alkyl, $R_2$ is hydrogen, alkyl of 1 to 12 carbon atoms, cycloalkyl or aralkyl, $R_3$ is an aryl, substituted aryl or pyridyl, $R_4$ is hydrogen, hydroxy or cyano, $n$ is an integer of 3 or 4 and _____ may be a single or a double bond and the pharmaceutically acceptable salts of the above.

When $R_3$ or $R_4$ is an aryl radical, the radical may be, for example, a chlorophenyl, nitrophenyl, aminophenyl, acetamidophenyl, benzenesulfonamidophenyl, naphthyl or chloronaphthyl radical.

The acid addition salts of the compound of the present invention include such salts as hydrochlorides, sulfates, maleates, fumarates and 1,1'-methylene-bis-(2-naphthol-3-carboxylates) and quaternary salts.

The free bases of the above compounds of the present invention are, in general, oils or lower melting solids, somewhat soluble in water and easily soluble in lower alkanols, benzene, toluene, acetone, chloroform or the like. The salts of the present compounds are characteristically soluble in water and other hydroxylated solvents and are usually insoluble in non-polar solvents.

The new compounds of this invention include for example, 1-(3-dimethylaminopropyl)-4-(4-nitrophenyl)-piperidine,
1-(3-ethylmethylaminopropyl)-4-(4-phenyl)-piperidine,
1-[3-(N-methylbutylamino)propyl]-4-(4-chlorophenyl) piperidine,
1-[3-(N-methyloctylamino)-propyl]-4-(1-naphthyl) piperidine,
1-(4-dimethylaminobutyl)-4-phenyl piperidine,
1-(3-dimethylaminopropyl)-4-(3-tolyl)-piperidine,
1-(3-dimethylaminopropyl)-4-cyano-4-phenyl piperidine,
1-(3-dimethylaminopropyl)-4-(2-chlorophenyl)piperidine,
1-(3-dimethylaminopropyl)-4-(4-chlorophenyl)-1,2,5,6-tetrahydropyridine, and the like.

The compounds of the present invention may conveniently be prepared by reacting a compound of the

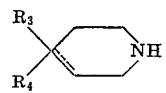

wherein $R_3$, $R_4$ and _____ are as defined hereinabove with the compound

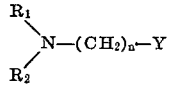

wherein Y is halogen, OH, $OSO_2$-alkyl, or $OSO_2$-aryl to form the compounds of the invention.

The compounds of the present invention may also be prepared by reacting a compound of the formula:

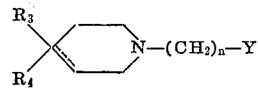

wherein Y is halogen, OH, $OSO_2$-alkyl or $OSO_2$-aryl with an amine of the formula:

to form the products of the invention.

The reaction is usually carried out by heating the hydropyridine reactant in the presence of an excess of $HNR_1R_2$ in a solvent at an elevated temperature.

The compounds of the present invention may also be prepared by the reaction of

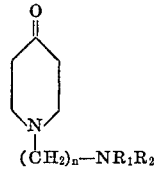

with an aryl lithium or heterocyclic lithium compound or aryl or heterocyclic magnesium halide in ether or a similar solvent followed by dehydration by heating or treatment with strong acids. The unsaturated compound may then be catalytically reduced to the compounds of the present invention. The following is the general reaction scheme described hereinabove.

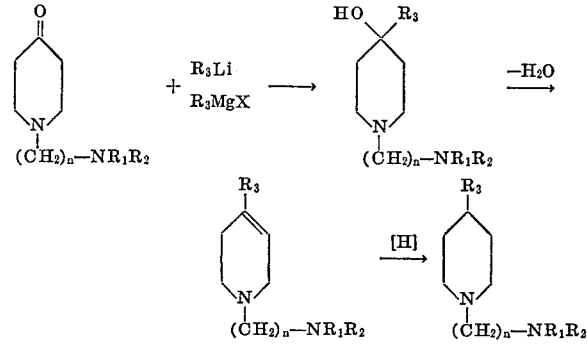

wherein $R_1$, $R_2$, $R_3$ and $n$ are as described above and X is halogen.

The process of this invention also includes compositions of matter comprising a pharmaceutically acceptable carrier and substituted piperidines of the present invention and the pharmaceutically acceptable salts of the substituted piperidines of the present invention, said compositions of matter capable of being administered at a dosage of 1 mg. to 500 mg. of the substituted piperidine per kilogram of body weight of the warm blooded animal being treated.

The compounds of the present invention are active in inhibiting the growth of protozoa. They are particularly active in inhibiting protozoa of the genus Trypanosoma, different species of which are known to be causative agents of serious parasitic diseases in man and animals (e.g., Trypanosomiasis or "sleeping sickness"). For example, the compound 1-(3-dimethylaminopropyl)-4-(4-acetamidophenyl)piperidine has been found to be active against experimental infections with *Trypanosoma cruzi* in mice. *Trypanosoma cruzi* is the causative agent of Chagas' disease in South America, an Ameican Trypanosomiasis.

The substituted piperidines described above may be dispensed as the active ingredient in compositions of the compound and an edible carrier. While the amount of drug to be given daily will depend in many factors such as size, weight, age, etc., of the warm blooded animal, it has been found that a daily intake of from 1 mg. to 500 mg./kg. of body weight will produce good results. The dosage unit may be in a form for a single unit per day, or smaller forms for use as multiple units per day. In the case of tablets, they may be of larger size, scored for use as fractional units one or more times per day.

The compositions may be dispensed as parenteral solutions or suspensions. If larger doses in small amounts are desirable it may in some cases be necessary to use parenteral suspensions.

The compositions of the present invention may take the form of syrups or pediatric drops. Such formulations usually contain one or more of the following suspending agents, buffer salts, stabilizers, preservatives, etc.

Screening of the compounds of the invention against *T. cruzi* is carried out as follows: seven to eight week old Manor strain female albino mice are inoculated subcutaneously with approximately 50,000 parasites (from infected donor mice), the median survival time of untreated mice being thirteen to sixteen days. Candidate compounds are administered by drug-diet on days 6–12 post-inoculation. The principal criterion of chemotherapeutic activity is the survival time of treated mice relative to untreated mice but examination of the peripheral blood and of various organs for parasites is also done in some experiments. Activity is unaffected when the compound is administered by gavage, of by subcutaneous or intraperitoneal injection. When compounds of the present invention are administered to mice infected with *T. cruzi* as above, over 80% of the animals are healthy and free of parasites thirty days after the date of infection.

The following examples illustrate in detail the preparation of representative substituted arylpiperidines of the present invention.

EXAMPLE 1

Preparation of 1-(3-dimethylaminopropyl)-4-phenylpiperidine dimaleate

A mixture of 7.1 grams of 4-phenylpiperidine, 8.0 grams of 3-dimethylaminopropyl chloride hydrochloride, 10.0 grams of sodium bicarbonate, and 200 ml. of ethylene glycol monomethylether is stirred at reflux for twenty-four hours. After cooling to room temperature, the inorganic solids are filtered off, and the filtrate concentrated to dryness under reduced pressure. The residue is taken up in chloroform, washed with sodium hydroxide solution and water and then dried over magnesium sulfate. Removal of the chloroform under reduced pressure leaves 8.8 grams of a colorless oil, which is converted to the title compound by treatment with maleic acid in acetone solution. The yield is 12.5 grams and the melting point 190°–191° C.

EXAMPLE 2

Preparation of 1-(3-dimethylaminopropyl)-4-(4-nitrophenyl)-piperidine dimaleate

Employing the conditions described in Example 1, but using 4-(4-nitrophenyl)piperidine in place of the 4-phenylpiperidine, the title compound is obtained as a pale yellow solid melting at 139°–141° C. The free base melts at 38°–40° C.

EXAMPLE 3

Preparation of 1-(3-dimethylaminopropyl)-4-(4-aminophenyl)-piperidine trimaleate Three grams of 1-(3-dimethylaminopropyl)-4-(4-nitrophenyl)piperidine (Example 2) is dissolved in 100 ml. of ethyl acetate, 0.5 gram of platinum oxide added, and the mixture subjected to hydrogenation at 30–45 lbs. per sq. inch pressure on a Parr apparatus. When hydrogen uptake is complete, the mixture is filtered, and the filtrate treated with an acetone solution of maleic acid to yield the title compound, melting point 80°–85° C.

EXAMPLE 4

Preparation of 1-(3-dimethylaminopropyl)-4-(4-acetamidophenyl)-piperidine dimaleate A solution of 3.2 grams of 1-(3-dimethylaminopropyl)-4-(4-aminophenyl)piperidine in 150 ml. of ethyl acetate (prepared as described in Example 3) is treated with 5 ml. of acetic anhydride, and the mixture stirred at room temperature for two hours. The volatile components are removed under reduced pressure and the residual oil then converted to the title compound by treatment with an acetone solution of maleic acid. The melting point is 157°–158° C.

EXAMPLE 5

Preparation of 1-(3-dimethylaminopropyl)-4-(4-carbethoxyaminophenyl)piperidine

A solution of 4.5 grams of 1-(3-dimethylaminopropyl)-4-(4-aminophenyl)piperidine in 150 ml. of ethyl acetate (prepared as described in Example 3) is treated with a solution of 3 ml. of ethyl chloroformate in 150 ml. of ethylacetate. After thirty minutes, the precipitate is collected, converted to the free base by treatment with concentrated sodium hydroxide solution and recrystallized from a diethyl ether-hexane mixture to give the pure compound melting at 83°–85° C.

EXAMPLE 6

Preparation of 1-(3-dimethylaminopropyl)-4-(4-benzenesulfonamidophenyl)piperidine The above compound is prepared by the procedure of Example 5, benzenesulfonyl chloride replacing the ethyl chloroformate. Recrystallization from a mixture of diethyl ether and hexane gives the pure compound melting at 104°–105° C.

EXAMPLE 7

Preparation of 1-(3-dimethylaminopropyl)-4-cyano-4-phenylpiperidine dimaleate

The subject compound is prepared by the procedure of Example 1, 4-cyano-4-phenylpiperidine replacing the 4-phenylpiperidine. The compound melts at 193° C.

EXAMPLE 8

Preparation of 1-(3-dimethylaminopropyl)-4-phenyl-1,2,5,6-tetrahydropyridine dimaleate The above compound is prepared by the method of Example 1, 4-phenyl-1,2,5,6-tetrahydropyridine replacing the 4-phenylpiperidine. The pure compound melted at 171°–172° C.

Alternatively, the subject compound is prepared as follows: A mixture of 175 grams of N,N-dimethyl-1,3-propylenediamine dihydrochloride and 167 grams of 37% aqueous formaldehyde solution is heated to 65° C., with stirring. Fifty-nine grams of α-methylstyrene is then added dropwise, the temperature being maintained at 55°–56° C. by intermittent external cooling. When addition is completed, the mixture is stirred at room temperature for two hours, diluted with 125 ml. of methanol, and let stand overnight. The mixture is then taken to dryness under reduced pressure, the residue dissolved in 125 ml. of hot 12 N hydrochloric acid, cooled to room temperature, and the solution then made alkaline with 40 ml. of 10 N sodium hydroxide solution. The oily suspension is extracted with toluene, the toluene layer dried and concentrated to an oil under reduced pressure. Treatment with an acetone solution of maleic acid gives the title compound identical by chemical and biological properties with that obtained from the preparation by the previous procedure.

EXAMPLE 9

Preparation of 1-(3-dimethylaminopropyl)-4-(4-chlorophenyl)-1,2,5,6-tetrahydropyridine diamaleate The compound is prepared by the procedure of Example 1, 4-(4-chlorophenyl)-1,2,5,6-tetrahydropyridine replacing the 4-phenylpiperidine. The pure compound melts at 169°–170° C.

EXAMPLE 10

Preparation of 1-(3-dimethylaminopropyl)-4-phenylpiperidine dimaleate

A solution of 12.2 grams of 1-(3-dimethylaminopropyl)-4-phenyl-1,2,5,6-tetrahydropyridine (free base of Example 8) is dissolved in 200 ml. of ethanol containing 10 ml. of concentrated hydrochloric acid. After addition of 1.0 gram of platinum oxide, the mixture is hydrogenated at 30–45 lbs. per sq. inch pressure on a Parr apparatus until hydrogen uptake is complete. The mixture is filtered and the filtrate concentrated to dryness under reduced pressure. The residue is made alkaline and the resultant oily 1-(3-dimethylaminopropyl)-4-phenylpiperidine separated and is converted to the dimaleate salt with an acetone solution of maleic acid, identical in all respects with the product as prepared in Example 1.

EXAMPLE 11

Preparation of 1-(3-dimethylaminopropyl)-4-(4-chlorophenyl)-piperidine dihydrochloride The preparation of the above compound is effected by the procedure of Example 10, using as starting material 1-(3-dimethylaminopropyl)-4-(4-chlorophenyl) - 1,2,5,6-tetrahydropyridine (free base of Example 9). The melting point of the pure compound is 268°–270° C.

EXAMPLE 12

Preparation of 1-(3-dimethylaminopropyl)-4-hydroxy-4-phenylpiperidine dimaleate

The subject compound is prepared by the procedure of Example 1, 4-hydroxy-4-phenylpiperidine replacing the 4-phenylpiperidine. The compound melts at 175°–176° C.

Alternatively, the subject compound is prepared by the action of phenylmagnesium halide or phenyllithium upon 1-(3-dimethylaminopropyl) - 4-piperidone, followed by careful acidification with acetic acid, and conversion to the maleate salt. Treatment of the subject compound with hydrogen in the presence of Raney nickel or platinum oxide under pressure leads to the formation of the compound of Example 1, while the action of concentrated mineral acids gives the compound of Example 8.

EXAMPLE 13

Preparation of 1-(3-dimethylaminopropyl)-4-(4-pyridyl)-piperidine trimaleate

The title compound is prepared by the method of Example 1, 4-(4-pyridyl)piperidine replacing the 4-phenylpiperidine. The pure compound melts at 130°–135° C. with decomposition.

EXAMPLE 14

Preparation of 1-(3-chloropropyl)-4-phenylpiperidine

A mixture of 100 grams of 4-phenylpiperidine, 200 grams of 3-chloro-1-bromopropane, 84 grams of sodium bicarbonate, and 800 ml. of benzene is stirred at reflux for three to six hours. The hot reaction mixture is filtered, the filtrate washed with water, and concentrated to an oil under reduced pressure. The residual 1-(3-chloropropyl)-4-phenylpiperidine is suitable for use without further purification or may be converted to its maleate salt melting at 95°–97° C.

EXAMPLE 15

Preparation of 1-[3-(N-methylbutylamino)propyl]-4-phenylpiperidine dimaleate

A mixture of 11.9 grams of 1-(3-chloropropyl)-4-phenylpiperidine (Example 14), 6.0 grams of N-methylbutylamine, 5.0 grams of sodium bicarbonate, and 250 ml. of ethanol is stirred at reflux for eighteen hours. It is then cooled, filtered, and the filtrate concentrated under reduced pressure. The residue is taken up in benzene, washed with water, and the benzene removed under reduced pressure. Addition of an acetone solution of maleic acid to the residual oil yields the title compound melting at 171°–173° C.

Alternatively, the subject compound may be prepared by the method of Example 1, by the reaction of 3-(N-methylbutylamino)propyl chloride and 4-phenylpiperidine.

EXAMPLE 16

Preparation of 1-[3-(N-methylphenylethylamino)propyl]-4-phenylpiperidine dimaleate The preparation of the subject compound is carried out by the procedures described in Example 15, N-methylphenylethylamine replacing the N-methylbutylamine in the first and 3-(N-methylphenylethylamino)propyl chloride replacing the 3-(N-methylbutylamino)propyl chloride in the second. The pure compound melts at 195°–197° C.

EXAMPLE 17

Preparation of 1-[3-(N-methylcyclohexylamino)propyl]-4-phenylpiperidine dimaleate The preparation of the above compound is carried out by the procedures described in Example 15, N-methylcyclohexylamine replacing the N-methylbutylamine in the first preparation and 3-(N-methylcyclohexylamino)propyl chloride replacing the 3-(N-methylbutylamino)propyl chloride in the second preparation. The pure compound melts at 212°–214° C.

EXAMPLE 18

Preparation of 1-(3-dimethylaminopropyl)-4-(1-naphthyl)piperidine dimaleate

The subject compound is prepared by the procedure of Example 1, 4-(1-naphthyl)piperidine replacing the 4-phenylpiperidine.

EXAMPLE 19

Preparation of 1-(4-dimethylaminobutyl)-4-phenylpiperidine dihydrochloride

A mixture of 10.0 grams of 1-(4-aminobutyl)-4-phenylpiperidine and 10 ml. of 98% formic acid is treated with 10 ml. of 37% aqueous formaldehyde solution. The reaction mixture is kept at 30°–40° C. for several hours, then refluxed for several hours. After cooling to room temperature, 20 ml. of concentrated hydrochloric acid is added, and the mixture evaporated to dryness to yield the subject compound.

What is claimed is:

1. A member selected from the compounds of the formula:

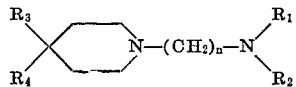

wherein $R_1$ is lower alkyl, $R_2$ is selected from the group consisting of hydrogen, lower alkyl, cyclohexyl and phenylloweralkyl, $R_3$ is selected from the group consisting of nitrophenyl, aminophenyl, acetamidophenyl, carbethoxyaminophenyl, benzenesulfonamidophenyl, naphthyl, and pyridyl, $R_4$ is selected from the group consisting of hydrogen, hydroxyl, and cyano, $n$ is an integer of 3 to 4, and the pharmaceutically acceptable salts thereof.

2. The compound 1-(3-dimethylaminopropyl)-4-phenylpiperidine.

3. The compound 1-(3-dimethylaminopropyl)-4-cyano-4-phenylpiperidine.

4. The compound according to claim 1, 1-(3-dimethylaminopropyl)-4-(4-aminophenyl)piperidine.

5. The compound according to claim 1, 1-(3-dimethylaminopropyl)-4-(4-carbethoxyaminophenyl)piperidine.

6. The compound according to claim 1, 1-(3-dimethylaminopropyl)-4-(4-nitrophenyl)piperidine.

7. The compound according to claim 1, 1-(3-dimethylaminopropyl)-4-(4-acetamidophenyl)piperidine.

8. The compound 1-[3-(N-methylbutylamino)-propyl]-4-phenylpiperidine.

References Cited
UNITED STATES PATENTS

| | | | |
|---|---|---|---|
| 2,945,032 | 7/1960 | Marxer | 260—247.5 |
| 3,125,488 | 3/1964 | Biel | 167—65 |

HENRY R. JILES, Primary Examiner

G. T. TODD, Assistant Examiner

U.S. Cl. X.R.

260—293.4, 294, 294.3, 294.7, 294.8, 294.9, 295, 296, 999